United States Patent
Taniwaki et al.

(10) Patent No.: US 7,437,659 B2
(45) Date of Patent: Oct. 14, 2008

(54) AUTOMATIC CORRECTION, AND SKIPPING OF DOCUMENT DESIGN PROBLEMS BASED ON DOCUMENT TYPES

(75) Inventors: George Taniwaki, Redmond, WA (US);
Nitin Chopra, Bellevue, WA (US);
Benjamen Eric Ross, Seattle, WA (US);
Matt Wood, Redmond, WA (US);
Donald Elman, Seattle, WA (US); Josh Pollock, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 245 days.

(21) Appl. No.: 10/356,972

(22) Filed: Feb. 3, 2003

(65) Prior Publication Data

US 2004/0153971 A1    Aug. 5, 2004

(51) Int. Cl.
*G06F 15/00* (2006.01)

(52) U.S. Cl. .................. 715/200; 715/210; 715/234; 358/1.14

(58) Field of Classification Search ............ 715/500, 715/513, 515, 526, 533, 200, 205, 209–211, 715/234, 243–276, 531; 358/1.15, 1.11, 358/1.12, 1.14, 518
See application file for complete search history.

(56) References Cited

U.S. PATENT DOCUMENTS

| | | | | |
|---|---|---|---|---|
| 5,367,453 A | * | 11/1994 | Capps et al. | 715/531 |
| 5,576,955 A | * | 11/1996 | Newbold et al. | 715/533 |
| 5,678,053 A | * | 10/1997 | Anderson | 704/1 |
| 5,787,451 A | * | 7/1998 | Mogilevsky | 715/533 |
| 5,812,863 A | * | 9/1998 | Ishikawa | 715/533 |
| 5,835,722 A | * | 11/1998 | Bradshaw et al. | 709/225 |
| 5,963,641 A | * | 10/1999 | Crandall et al. | 380/2 |
| 6,012,075 A | * | 1/2000 | Fein et al. | 715/540 |
| 6,608,697 B1 | * | 8/2003 | Schorr et al. | 358/1.15 |
| 6,694,484 B1 | * | 2/2004 | Mueller | 715/513 |
| 6,888,542 B1 | * | 5/2005 | Clauss | 345/420 |
| 2002/0083377 A1 | * | 6/2002 | Clauss et al. | 714/57 |
| 2002/0116399 A1 | * | 8/2002 | Camps et al. | 707/200 |

FOREIGN PATENT DOCUMENTS

WO    WO 02/08861 A3 *   1/2002

OTHER PUBLICATIONS

"Pre Flight Pro Prevent Prepress Waste by Preflighting Files and Automating Workflow", www.qmedia.com, Jun. 18, 2001.*
"Guidelines for Preparing Printer-Ready PDF files in Quark Xpress", www.aba.com/aba/pdf/products/matls.pdf.*
"Getting Results with Microsoft Office 97", Microsoft, 1997, pp. 72-73, 98-101.*

* cited by examiner

*Primary Examiner*—Cesar B Paula
(74) *Attorney, Agent, or Firm*—Merchant & Gould (57) ABSTRACT

A publishing program can provide continuous and real-time feedback on possible design problems while a document is being edited or created. The feedback can include displaying a user interface that has a real-time list of any design problems that may be a result of the current edits or creations in a document. The list is updated as the document is being created or edited. A user can toggle between the list and the document as often as desired. The list can identify all current potential publication problems of an electronic document as well as the types of the publication problems that may be present in an electronic document.

19 Claims, 10 Drawing Sheets

AUTOMATIC CORRECTION, AND SKIPPING OF DOCUMENT DESIGN PROBLEMS BASED ON DOCUMENT TYPES

TECHNICAL FIELD

The present invention relates to checking and editing electronic documents. More specifically, it relates to an interactive process for reviewing and editing an electronic document for potential problems prior to publishing.

BACKGROUND OF THE INVENTION

Conventional document inspection programs can review and check an electronic document for possible problems prior to the electronic document being published. For example, document inspection programs are often used to check electronic documents created by a document editing program for possible errors or problems that could exist if the electronic document will be published with a commercial printing process. A document inspection process can identify possible errors prior to publishing an electronic document. Such a process can save significant time and money spent for applications such as commercial printing, website publishing, desk top publishing, and other like publishing applications.

Specifically, conventional document inspection programs can review electronic documents produced by document editing programs to determine if too much blank space exists on top of a page, whether objects are not properly positioned on a page, whether an object placed on a page is invisible, and whether improper colors are being used for a particular application. These are just a few of the problems that can be identified by conventional document inspection software.

While conventional document inspection software can be quite helpful to identify potential publishing problems, such software is usually executed or run as a separate step after a document has been created in a document editing program, and not while the document is being edited. Using a document inspection program after creating an electronic document with a document editing program can be inefficient since many problems in the electronic document can be related to one another and could be resolved rather quickly if identified while the document was being created.

Another drawback of document inspection software is that it is usually a program that is separate from the document editing program. That is, the document inspection software is usually created by a manufacturer who is different than the manufacturer of the document editing program. Therefore, the document inspection software manufacturer may not be familiar with all of the programming code of the document editing program and incompatibility issues can result.

Further, conventional document inspection software typically may not interact with the electronic document that may exist in the document editing program. In other words, the document inspection software usually reports errors present in a document but the software cannot make changes to the electronic document as it exists in the document editing program. Third party document inspection software usually exists as a completely separate application relative to the document editing program.

While numerous separate document inspection software programs exist, some document editing programs have some document inspection functions built into the document editing program. However, these document inspection functions are usually very limited and also have several of the problems of the document inspection software.

Some problems of the document inspection software and problems of built-in document inspection functions document editing programs can include running checks of electronic document after the electronic document has been created. Another problem of document inspection software and document inspection functions of the conventional art is the sequential presentation of problems when the checking process is initiated. In other words, when a conventional document inspection process is started, the first problem of the electronic document is usually identified and the user may only proceed serially to the next problem after resolving the current problem that has been identified. Identifying the problem can include magnifying the area on the page containing the problem and possibly highlighting the problem with a color.

During the sequential checking process, a user is often forced to make a decision of how to correct the problem that is being identified. With conventional document inspection techniques, the user will have no idea of how many publishing problems exist in a document and what type of problems exist in the document. The sequential presentation of problems of conventional document inspection techniques can be characterized as a very rigid and non-interactive process.

Because the potential publishing problems during the document inspection process are usually magnified, it is difficult and often impossible to see any other problems that may exist on the current page. If a user does correct a problem that has been identified with conventional document inspection techniques, the user is usually not given any indication that the action taken by the user has corrected the current problem or any of the remaining problems that have not been checked. With the conventional document inspection process, the user has very little or no control over the document inspection process.

Accordingly, there is a need in the art for a system and method for checking and resolving publication design problems that is interactive and permits a user to have some control during a document inspection process. There is a further need in the art for a document inspection process that can provide continuous and real/time feedback on possible design problems while a document is being edited or created. There is a further need in the art for a document inspection process that identifies all problems of an electronic document and that identifies the types of problems that may be present in an electronic document. Another need exists in the art for a document inspection process that is integral with a publishing program such that options may be available to the user for automatic correction of certain reoccurring problems. And lastly, a need exists in the art for a document inspection process that is simple to use and easy to manage while an electronic document is being created or edited.

SUMMARY OF THE INVENTION

A publishing program can provide continuous and real-time feedback on possible publication design problems while a document is being edited or created. A design problem can comprise any number of errors in a document that could result in publishing difficulty. For example, too much white space at the top of a page in a document or objects hiding other objects may be considered a problem.

The feedback of the present invention can comprise a user interface that displays a real-time list of any design problems that may be a result of the current edits or creations in a document. This list of design problems can provide an overall or big picture of possible design problems for a document that should be corrected prior to publishing the document.

The user interface and continuous feedback can be integrated with the publishing program such that edits, deletions, or creations can be made to the document while the user interface is displayed and running. This also means that the software modules providing the feedback and user interface can be integrated with the publishing program.

The user interface of the present invention can allow a user to select from the list of design problems that may exist in the document. Once a design problem is selected from the list of problems, the page containing the problem as well as the problem itself can be displayed. The problem can be made more visible with any variety of screen mechanisms such as highlighting the problem with different colors, flashing outlines around the problem, and other like techniques to draw attention to the design problem.

The user interface can display and process options that can be selected for resolving or correcting a particular design problem. The user interface can display autocorrect options. When these autocorrect options are selected, the publishing program can automatically correct the design problem without further user action.

One advantage of the present invention can be that the continuous and real-time feedback is integrated into the workflow for creating or editing a document similar to a spell checker in a document editing program. Another advantage of the present invention can be that the list of design problems can be navigated at anytime by a user. In other words, unlike the prior art which forced a decision to be made with respect to a design problem being evaluated because of sequential processing of the design problems, design problems displayed in the list by the user interface of the present invention can be selected randomly by a user.

Since the user interface permit random selection of design problems, it follows that the user interface can allow for the prioritizing of design problems. A user can decide when she wants to correct a design problem. Further, the publishing program can be instructed to not perform certain checks if desired by a user. That is, certain checks for identifying potential design problems can be set so that they are not executed by the publishing program.

From the list of problems displayed by the user interface, relationships between two or more problems can be ascertained. And additionally, this continuous and real-time feedback can train the user so that he or she will learn how to avoid design problems by seeing immediate feedback on current creations, additions, or deletions.

The continuous and real-time feedback in a document means that as changes are made in the document, the design problems can be updated in response to these changes. Therefore, if a change is made to the document and this change corrects a design problem present in the list, the list can be updated so that the problem is removed from the list as soon as change is completed.

The present invention can automatically detect an output type when the document is published. The output type can be any one of desktop publishing through a computer printer, web site design and publishing over the Internet, or commercial printing, just to name a few output types. This automatic detection of output types can enable efficient detection of design problems because the publishing program can search for problems that are specific to the output type while avoiding or not searching for problems that may exist for another output type.

DETAILED DESCRIPTION OF EXEMPLARY EMBODIMENTS

A publishing program can provide continuous and real-time feedback on possible design problems while a document is being edited or created. The feedback can include displaying a user interface that has a real-time list of any design problems that may be a result of the current edits or creations in a document.

Exemplary Operating Environment

Figure 1A:
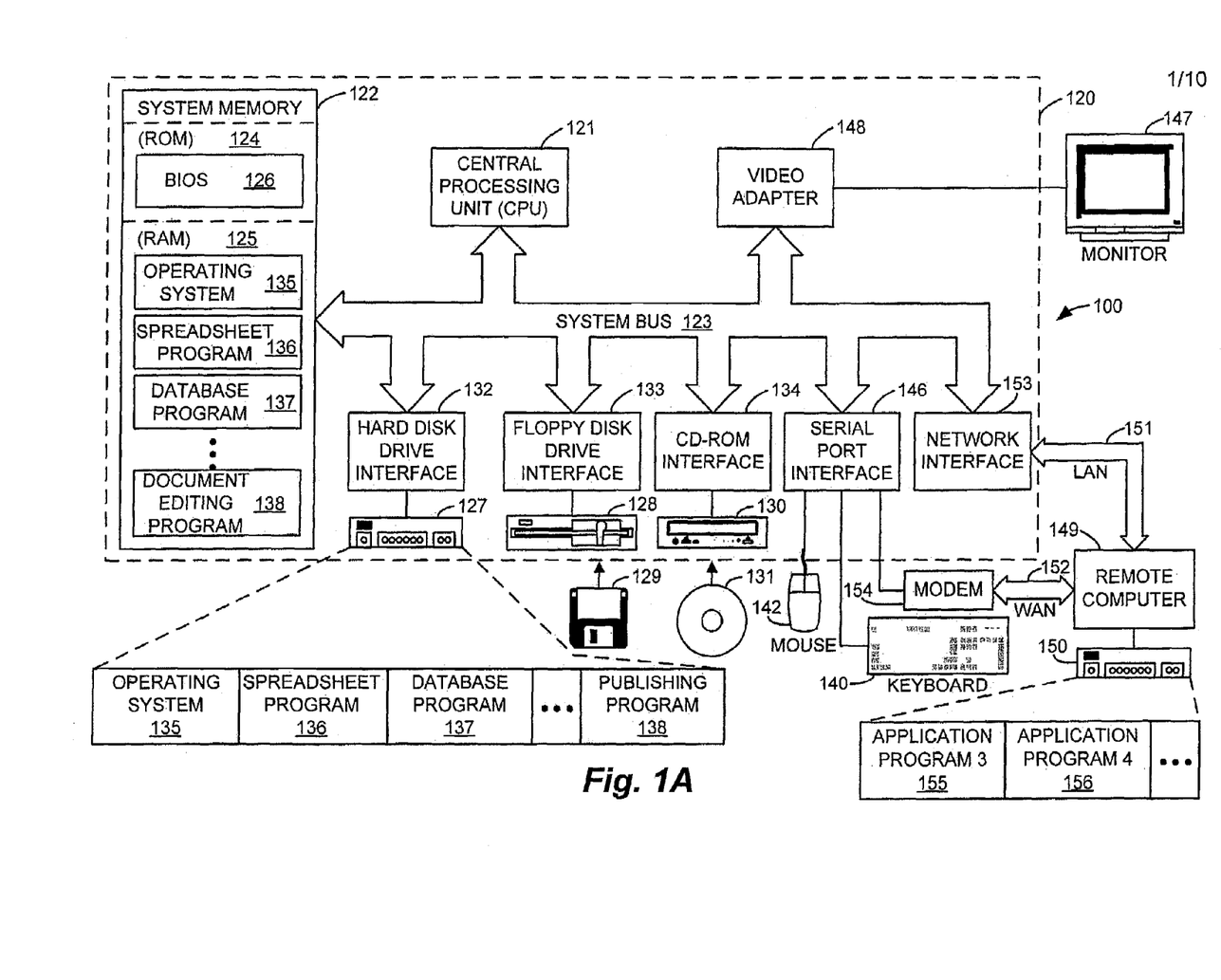
FIG. 1A illustrates exemplary software elements of the invention within a typical computer architecture.

Exemplary embodiments of the present invention will hereinafter be described with reference to the drawings, in which like numerals represent like elements throughout the several figures. FIG. 1A is a block diagram illustrating an exemplary operating environment for implementation of various embodiments of the present invention. The exemplary operating environment 100 includes a general-purpose computing device in the form of a conventional personal computer 120. Generally, the personal computer 120 includes a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes a read-only memory (ROM) 124 and a random access memory (RAM) 125. A basic input/output system (BIOS) 126, containing the basic routines that help to transfer information between elements within personal computer 120, such as during start-up, is stored in ROM 124.

Personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD-ROM or other optical media. Hard disk drive 127, magnetic disk drive 128, and optical disk drive 130 are connected to system bus 123 by a hard disk drive interface 132, a magnetic disk drive interface 133, and an optical disk drive interface 134, respectively.

Although the exemplary environment described herein employs hard disk 127, removable magnetic disk 129, and removable optical disk 131, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 120.

A number of program modules may be stored on hard disk 127, magnetic disk 129, optical disk 131, ROM 124, or RAM 125, including an operating system 135, a spreadsheet program 136, a database program 137, and a document editing program 138. Program modules include routines, sub-routines, programs, objects, components, data structures, etc., which perform particular tasks or implement particular abstract data types. Aspects of the present invention can be implemented to create an electronic document with a publishing program 138.

A user may enter commands and information into personal computer 120 through input devices, such as a keyboard 140 and a pointing device 142. Pointing devices may include a mouse, a trackball, and an electronic pen that can be used in conjunction with an electronic tablet. Other input devices (not shown) may include a microphone, joystick, game pad, satellite dish, scanner, or the like. These and other input devices are often connected to processing unit 121 through a serial port interface 146 that is coupled to the system bus 123, but may be connected by other interfaces, such as a parallel port, game port, a universal serial bus (USB), or the like. A display device 147 may also be connected to system bus 123 via an interface, such as a video adapter 148. In addition to the monitor 147, personal computers typically include other peripheral output devices (not shown), such as speakers and printers.

The personal computer 120 may operate in a networked environment using logical connections to one or more remote computers 149. Remote computer 149 may be another personal computer, a server, a client, a router, a network PC, a peer device, or other common network node. While a remote computer 149 typically includes many or all of the elements described above relative to the personal computer 120, only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is often connected to the local area network 151 through a network interface or adapter 153. When used in a WAN networking environment, the personal computer 120 typically includes a modem 154 or other means for establishing communications over WAN 152, such as the Internet. Modem 154, which may be internal or external, is connected to system bus 123 via serial port interface 146. In a networked environment, program modules 155, 156 or portions thereof, depicted relative to remote computer 149, may be stored in the remote memory storage device 150. It will be appreciated that the network connections shown are exemplary and other means of establishing a communications link between the computers may be used.

Moreover, those skilled in the art will appreciate that the present invention may be implemented in other computer system configurations, including hand-held devices, multiprocessor systems, microprocessor based or programmable consumer electronics, network personal computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Exemplary Displays for User Interface

Figures 1B, 1C:
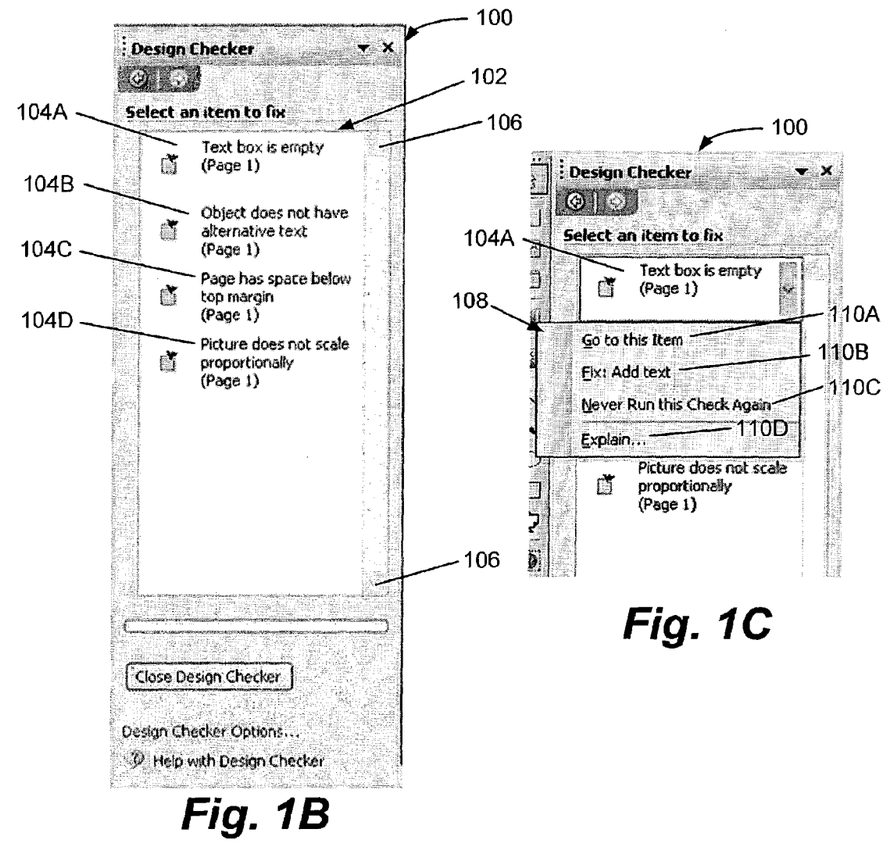
FIG. 1B is an exemplary display that illustrates a user interface that displays a real-time list of potential design problems in an electronic document according to one exemplary embodiment of the present invention.
FIG. 1C is an exemplary display that illustrates an entry of the real-time list of FIG. 1B being selected according to one exemplary embodiment of the present invention.

Referring to FIG. 1B, a user interface 100 is illustrated that comprises a real-time list 102 of potential design problems 104A, 104B, 104C, and 104D that may be a result of the current edits or creations in an electronic document. While the user interface 100 comprises a visual object that can be displayed on a computer screen, those skilled in the art realize that real-time feed-back of the present invention is not limited to a visual display of information. Real-time feed-back can comprise sound, voice synthesis, tactile displays, and other forms of interactive communications with a user.

In the exemplary embodiment illustrated in FIG. 1B, the first entry 104A of the real-time list 102 of the design problems can comprise a message that states a "Textbox is empty on page 1." This first entry 104A, and the remaining entries 104B, 104C, 104D can be selected by a user. For the current electronic document being reviewed, this list 102 is the complete list of the possible design problems of the electronic document being evaluated. When the list of problems 102 exceeds the size of the window or user interface 100, scroll buttons 106 can be used to scroll through the list 102 of problems.

As noted above, an advantage of the present invention is that the list 102 of the possible publication design problems 104 can be navigated at any time by a user while the user is creating or editing an electronic document. This navigational capability of the user interface 100 also permits the random selection of the design problems 104. A user can decide when he or she wants to correct a particular design problem 104 displayed in the list 102. Also, as can be seen from the list 102 of problems 104 displayed by the user interface 100, relationships between problems that are displayed in the list 102 can be ascertained.

Referring now to FIG. 1C, a menu 108 has been displayed in response to selecting the first entry 104A of the possible design publication problems 104. The menu 108 can comprise a plurality of options 110. A first option 110A can comprise a command for navigating to the particular problem identified. A second option 110B can include an auto correct feature where the system automatically corrects the problem 104A identified in the list 102. A third option 10C can comprise a command to not check for this type of problem again within the current electronic document. And a fourth option 110D can comprise a command to display text which explains the nature and type of problem selected from the list 102. As FIG. 1C further emphasizes, the user interface 100 is very interactive and allows a user to have significant control over the document inspection process that can run simultaneously while editing or creating an electronic document.

Figure 1D:
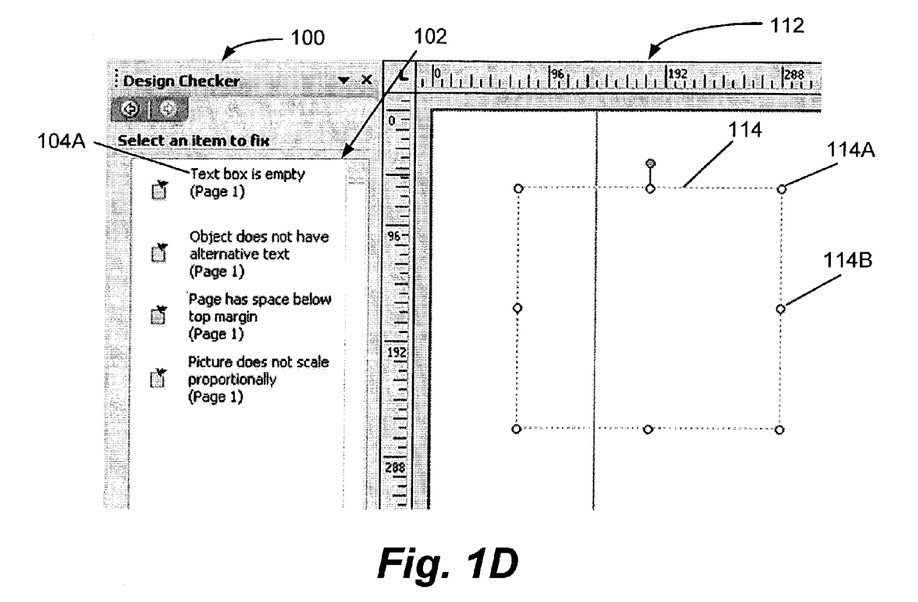
FIG. 1D is a display illustrating the exemplary user interface adjacent to an electronic document with a potential design problem being magnified in accordance with a previous selection the first entry of the real-time list of FIG. 1C according to one exemplary embodiment of the present invention.

Referring now to FIG. 1D, an electronic document 112 comprising the empty text box 114 is displayed adjacent to the user interface 100. Electronic document 112 is displayed in response to the selection of the first option 110A (navigating to the selected problem) of the menu 108 illustrated in FIG. 1C. The text box 114 is highlighted with circular markers 114A to focus the user's attention on the potential design problem. The present invention is not limited to the circular markers 114A, 114B. A potential design problem can be made more visible with any variety of screen mechanisms other than the circular markers 114A, 114B such as highlighting the problem with different colors, flashing outlines around the problem, as well as communicating the problem to the user via other communications such as sound, voice synthesis, and other like methods to draw the attention of the user to the potential publication design problem.

Figure 1E:
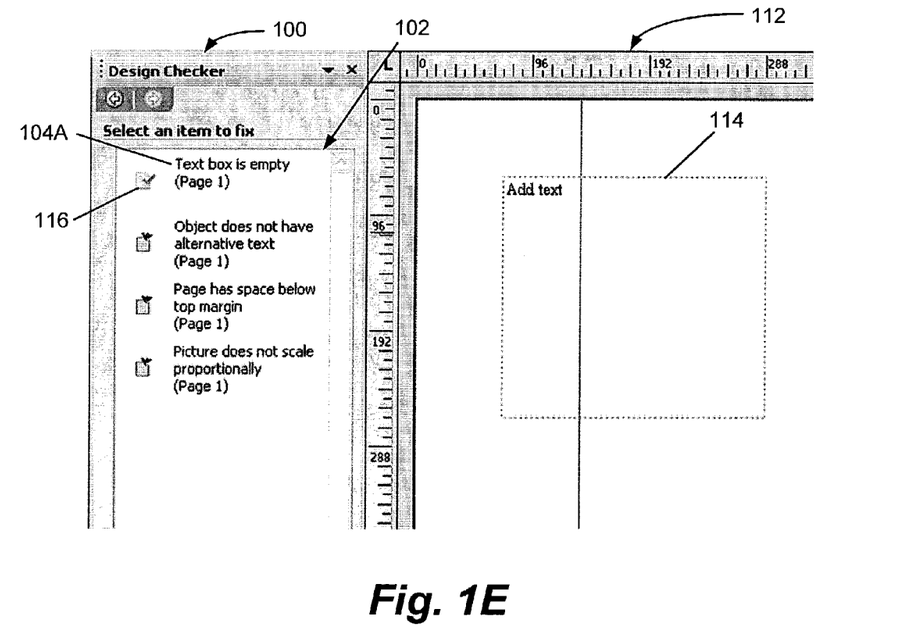
FIG. 1E is a display illustrating the real-time list after the problem identified by the first entry of the real-time list had been created according to one exemplary embodiment of the present invention.

Referring now to FIG. 1E, this figure illustrates user interface 104 and the electronic document 112 after a user has corrected the selected problem. As seen in the user interface 100, an icon 116 is changed relative to the previous iteration of the icon illustrated in FIG. 1D. Specifically, the icon 116 illustrated in FIG. 1E has changed to display a "check" mark to indicate to the user that the first problem 104A has been resolved. However, as noted above, the present invention is not limited to a visual display of how problems in electronic documents have been identified or corrected. In addition to or alternatively to the change in the icon 116, a user can be informed that the problem has been resolved by playing a sound, activating voice synthesis, or communicating with the user in some other manner so that they are aware that the problem 104A has been corrected.

Figure 1F:
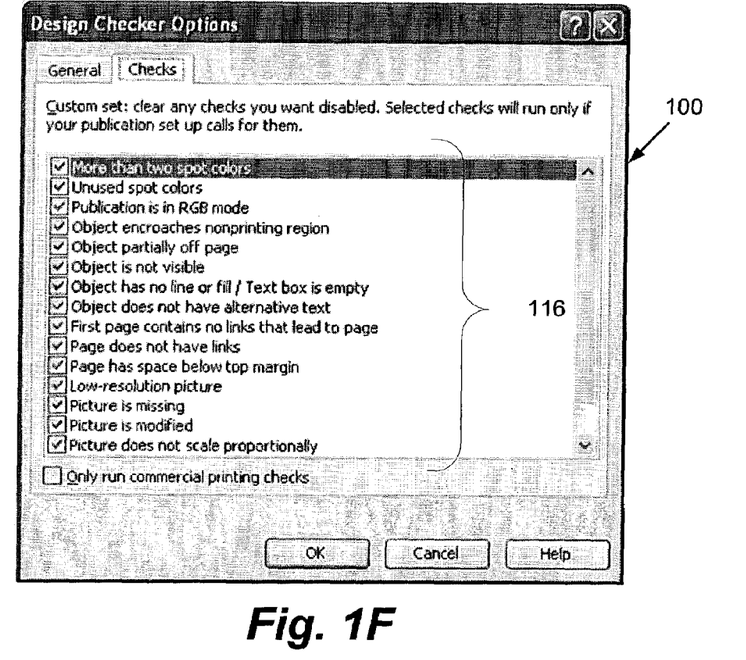
FIG. 1F is a display that illustrates a user interface comprising a list of checks to run on a document to determine if publication design problems are present in a document according to one exemplary embodiment of the present invention.

Referring now to FIG. 1F, the user interface 100 displays an exemplary list of checks 116 that can be run or used in an electronic document to determine if publication design problems are present in the electronic document. This window of the user interface 100 permits the selection and deselection of checks that can be run or used in an electronic document. Exemplary checks can include, but are not limited to, determining whether too much blank space exists on top of a page, whether an object is off the page, whether an object is visible on a page, whether an object has an improper color, or whether an object is disproportional on a page, and whether one object covers another object on the page. FIG. 1F includes additional checks. However, the present invention is not limited to the checks described above or the checks illustrated in FIG. 1F. Other checks for possible publication problems are not beyond the scope and spirit of the present invention.

Figure 1G:
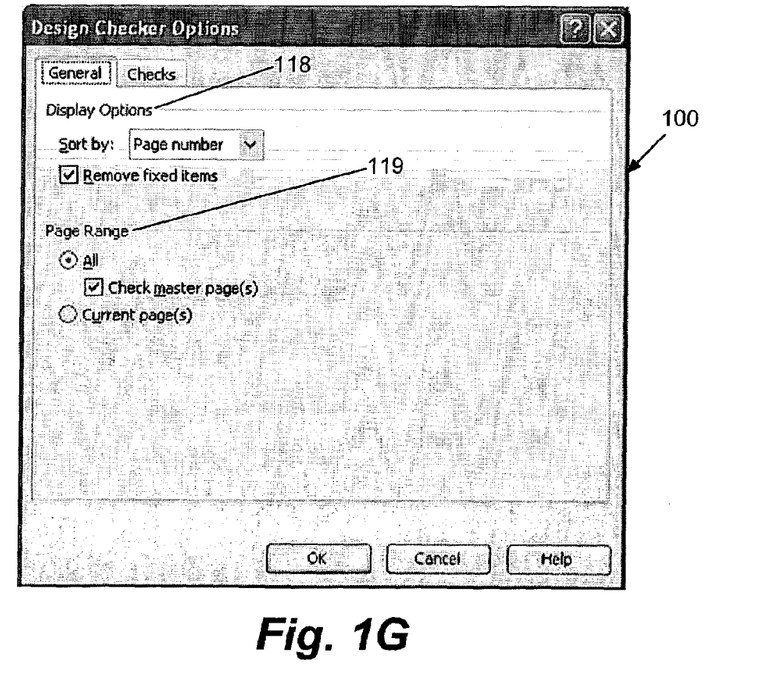
FIG. 1G is a display that illustrates a user interface comprising display options and a page range being evaluated according to one exemplary embodiment of the present invention.

Referring now to FIG. 1G, this display illustrates the user interface 100 comprising display options 118 for the real-time checklist 102 (not illustrated in this figure). The user interface 100 illustrated in FIG. 1G further includes a page range option 119 that allows the user to select which particular pages of the electronic document should be checked for possible design publication problems.

Exemplary Architecture

Figure 2A:
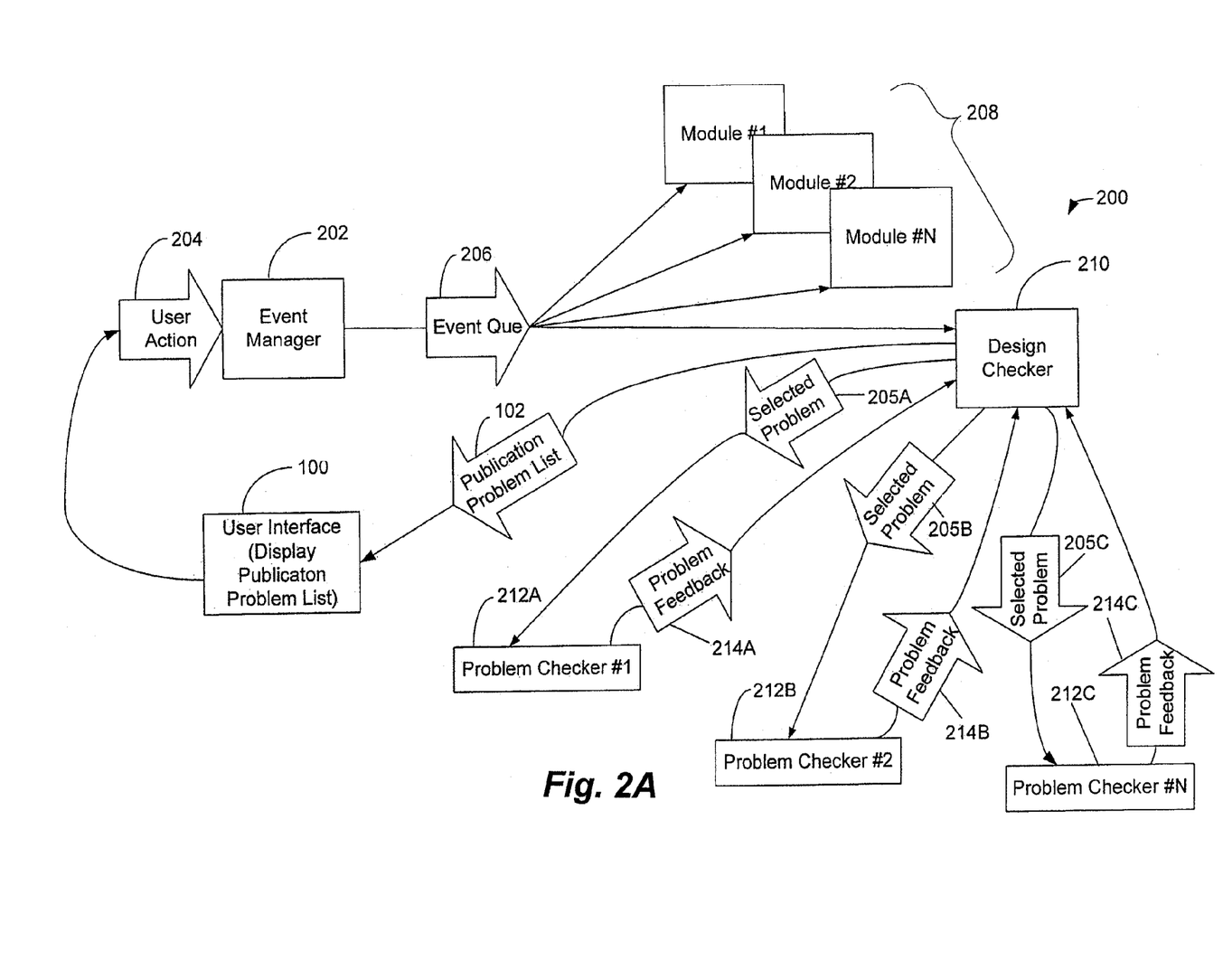
FIG. 2A illustrates additional software elements that interact to provide the system and method of the present invention.

Referring now to FIG. 2A, this figure illustrates the software elements that interact to provide the system and method for checking end-resulting publication design problems of the present invention. The present invention can include multiple computer programs or a single computer program which embody the functions described herein and illustrated in the exemplary architecture diagrams and the appended flow charts.

However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the exemplary architecture and flow charts and associated description in the application text, for example. Therefore, disclosure of a particular set of program code instructions is not considered necessary for an adequate understanding how to make and use the invention. The inventive functionality of the claimed computer program will be explained in more detail in the following description in conjunction with the remaining Figures illustrating the functions and program flow.

The system 200 can comprise an event manager 202, a design checker 210, one or more problem checkers 212(A), 212(B), 212(C), and a user interface 100 for displaying the list 102 of design problems. The event manager 202 can comprise a program module that monitors user action 204 made within an electronic document 112. This user action 204 can be stored as separate events in an event list. At the end of a comprehensive user action 204, the event manager 202 can filter out repetitive events from the event list.

For example, if a user moves an object ten times in a row, ten events would be stored in the event list that is present in the event queue 206. The event manager 202 can filter out events from the event list. Specifically, the event manager 202 can filter out repetitive events from the event list. The event manager 202 can then pass the filtered event list in the event queue 206 to the design checker 210.

Those skilled in the art recognize that user action 204 can comprise many different forms of communication with a computer. User action can include, but is not limited to, moving an object, resizing an object, changing a color of an object, changing color of text or background of an electronic document, going from a specific set of colors to other specific sets of colors (such as going from RGB to CMYK colors), voice commands, stylus or pen activations on a display, input received from a touch screen, and any other type of action that the user can perform to change an electronic document.

The event queue 206, comprising the event list, can be transmitted to other program modules 208 that may be present in a document publishing program. For some program modules 208, the event queue 206 may not be filtered by the event manager 202. Other program modules can include, but are not limited to a graphics manager, and other document publishing program modules. Event manager 202 specifically filters data within the event queue 206 that is destined for the design checker 210.

The design checker 210 can comprise a program module that receives the filtered event list from the event queue 206 sent by the event manager 202. The design checker 210 can further process the event list. The processing of the event list usually takes place during idle time of a system. In other words, idle time comprises time when a user is not entering data or activating any commands of the publication system.

Basically, the present invention provides the real time feedback to the user of potential publication design problems similar to how word processing programs continuously check spelling of a document during periods of time when a user does not interact with the electronic document of the word processing system. One object for using idle time to check a document is to not interrupt the user. Another object is to run checks when there are free CPU cycles.

The design checker 210 can filter out events from the event list that are unrelated to publishing of the electronic document. In other words, the design checker can filter the event list a second time relative to the first filtering performed by the event manager 202.

Figure 2B:
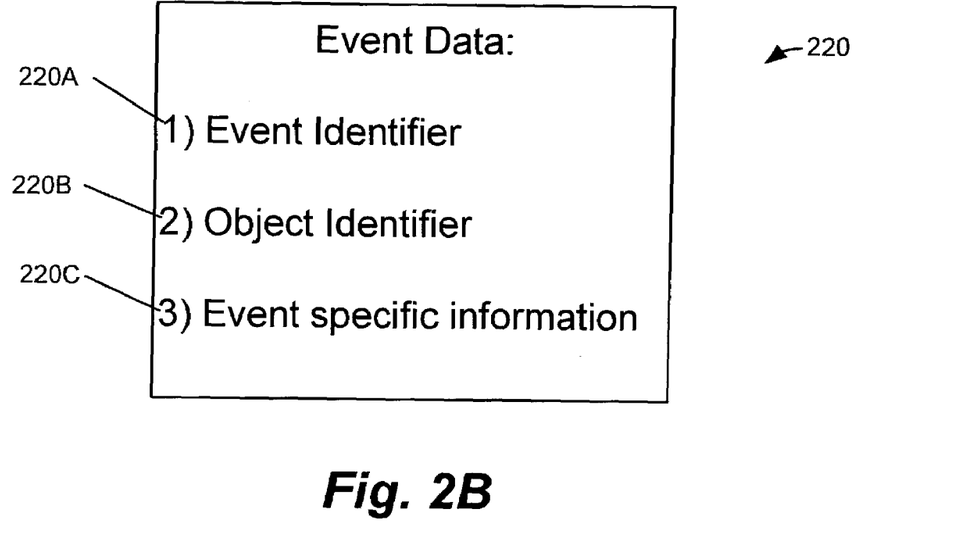
FIG. 2B illustrates exemplary elements of event data monitored by one exemplary embodiment of the present invention.

Referring briefly to FIG. 2B, this figure comprises an entry 220 of event data stored in event queue 206. An entry 220 of event data can comprise an event identifier 220(A), an object identifier 220(B), and event specific information 220(C). The event specific information 220(C) can include additional information as to what happened with respect to an event. For example, event-specific information 220(C) can describe the location of change on a page where a user event had occurred.

Referring back to FIG. 2A, the design checker 210 can also map the remaining events in the event list with potential problems in order to form a list 216 of checks 218 (illustrated in FIG. 2C) to be run on the electronic document 112.

Figure 2C:
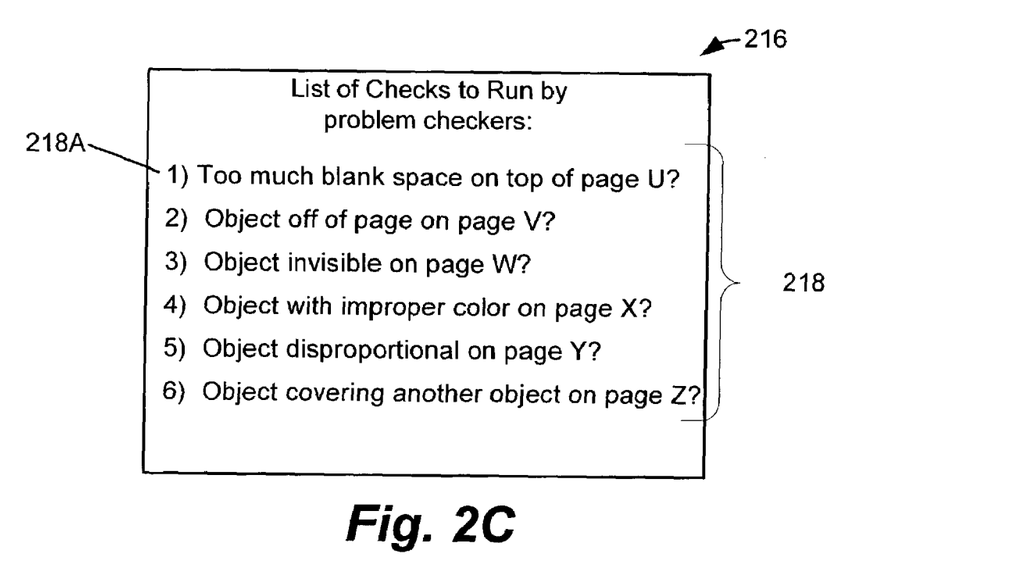
FIG. 2C illustrates an exemplary list of checks that can be uncovered after a mapping process according to one exemplary embodiment of the present invention.
Figure 5:
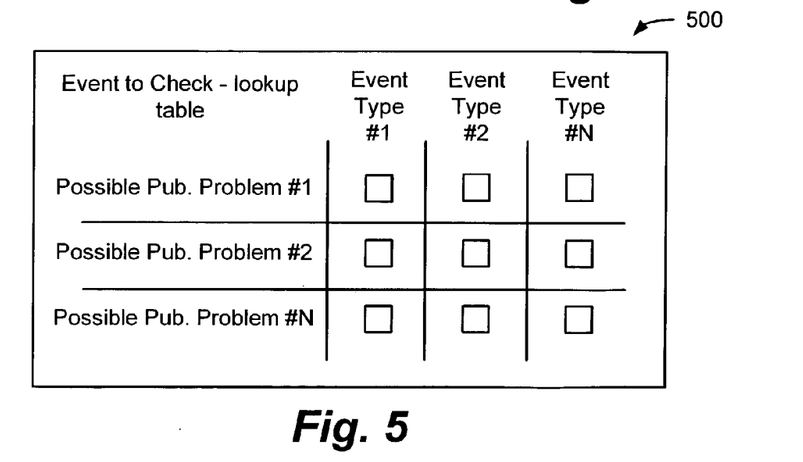
FIG. 5 illustrates an exemplary event-to-check lock-up table according to one exemplary embodiment of the present invention.

Referring briefly to FIG. 2C, this figure illustrates a list 216 of checks 218 to run on an electronic document. This list 216 of checks 218 can be created in response to a design checker 210 mapping events in the event list to a list of checks. Further details of this mapping process that takes place in an event-to-check-lookup table will be discussed in further detail below with respect to FIG. (5).

Referring back again to FIG. 2A, the design checker 210 can filter out repetitive checks 218 from the list 216 of checks, and the design checker 210 can also filter out checks 218 from the list 216 of checks that may have been resolved by current events being evaluated. For example, if a user deletes an object that may have been causing a design publication problem, then the design checker 210 can remove any checks 218 that were associated with the object prior to the deletion of the object.

The design checker 210 can forward individual checks 205(A), 205(B) and 205(C) to one or more problem checkers 212(A), 212(B), and 212(C). After receiving any feedback 214(A), 214(B), 214(C) from the problem checkers 212, the design checker 210 can build the list 102 of design problems that have been identified in the electronic document 112 as a result of the problem checker processing. The design checker can forward this list 102 of design problems to the user interface 100 for display and interaction with a user.

Each problem checker 212 can comprise one or more program modules that can execute check inquiries received from the design checker 210. A check can comprise determining if a particular object or page in an electronic document has a particular publication design problem. The problem checker 212 can report back information about whether a particular object, a set of objects, or a page in a document has a design publication problem to the design checker 210.

Communicating with the design checker 210 is the user interface 100. The user interface 100 can comprise one or more program modules that can receive the list 102 of design problems from the design checker 210 and display the list 102 of problems on a display device. The user interface 100 can receive input from a user that is specific to a particular problem 104 being displayed. Such input can comprise a request to display and correct a selected problem 104. The user interface 100 can also display options such as listed in menu 108 of how to correct the selected design problem 104 in the list 102 of problems being displayed.

As mentioned above, the user interface 100 is not limited to interacting with a user only visually. The user interface 100 can use sound, voice synthesis, tactile display, and other sensory or communication devices to interact with the user and to alert the user of a potential design problem.

Figure 3A:
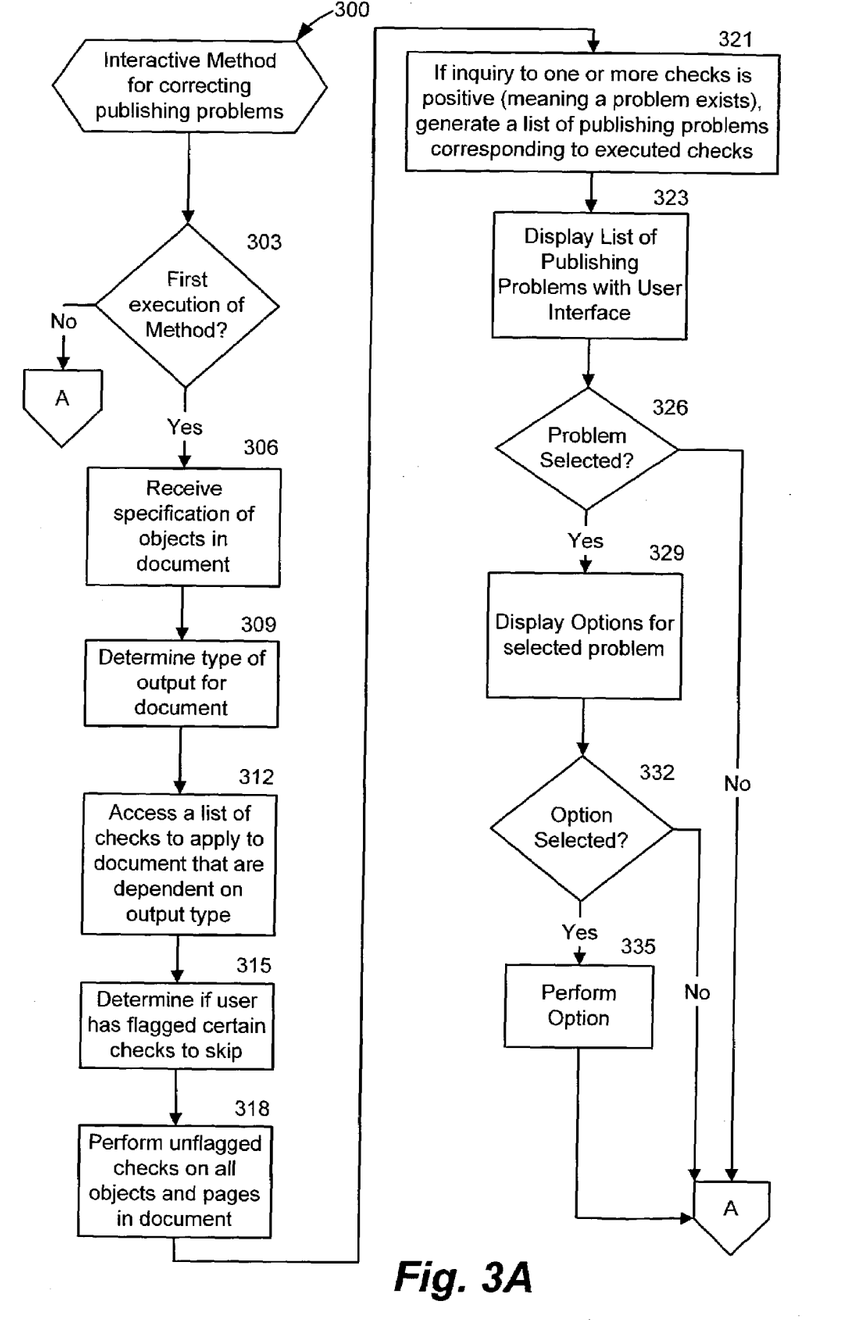
FIGS. 3A-3B illustrate a method for checking and resolving publication design problems in accordance with one exemplary embodiment of the present invention.
Figure 3B:
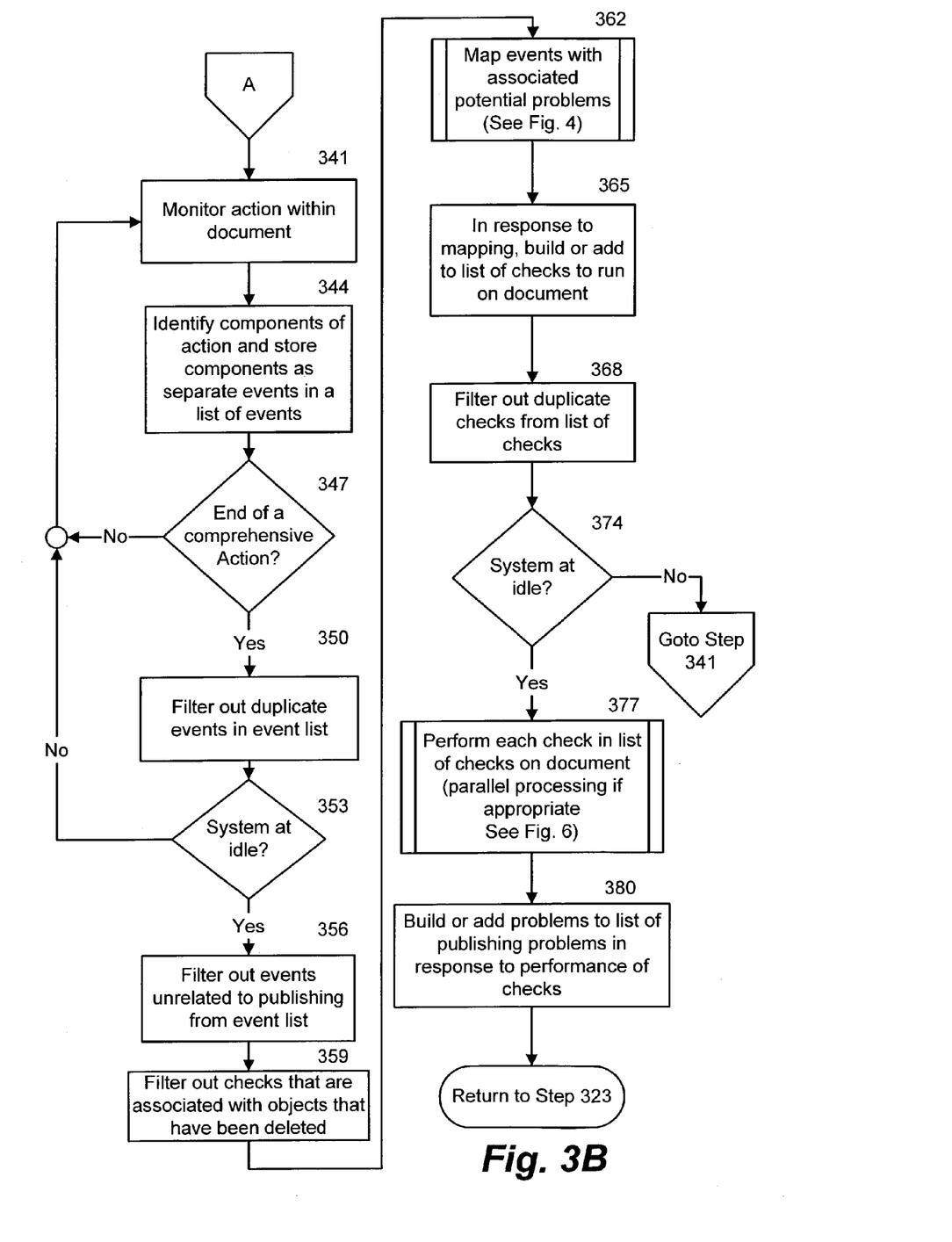

Exemplary Method for Monitoring and Correcting Design Publication Problems of a Document Referring now to FIGS. 3A and 3B, these figures illustrate a logic flow diagram of an overview of an exemplary process 300 for correcting publishing problems. It is noted that certain steps in the processes described below must naturally precede others for the present invention to function as described.

However, the present invention is not limited to the order of the steps described if such order or sequence does not alter the functionality of the present invention. That is, it is recognized that some steps may be performed before or after other steps or in parallel with other steps without departing from the scope and spirit of the present invention.

Decision step 303 is the first step of the exemplary process 300. In decision step 303, it is determined whether this is the first execution of the method. If the inquiry to decision step 303 is negative, then the "no" branch is followed to the page marker A to FIG. 3(B) which takes the process to step 341. If the inquiry to decision step 303 is positive, then the "yes" branch is followed to step 306. In step 306, the design checker 210 can receive a definition or specification of the objects in the electronic document 112. The specification of objects in the electronic document can be generated by the publishing program or a document editing program.

In step 309, the type of output for the electronic document can be automatically determined. For example, the design checker 210 can determine if electronic document is destined for commercial printing, web publication, desktop publishing, and other like output forms based upon user selection of options within the electronic document 112. However, in another alternate exemplary embodiment, this automatic detection of document output type can be deactivated or not available so that a user manually selects the output type for the electronic document.

In step 312, a list of checks to apply to the current electronic document that are dependent on the selected output type can be accessed. Subsequently, in step 315, the design checker 210 can determine if the user has flagged certain checks to skip based upon options that have been selected, such as in the list 116 of options of the user interface 100, as illustrated in FIG. 1F.

In step 318, the design checker 210 performs checks on all the objects and pages in the electronic document 112. Specifically, the design checker 210 forwards all of the checks to one or more problem checkers 212.

In step 321, if the inquiry to one or more checks performed by the problem checkers 212 is positive (meaning that a problem does exist in the current electronic document), then the design checker 210 generates the publication problem list 102. Next, in step 323, the user interface 100 displays the list 102 of publishing problems.

In decision step 326, the user interface 100 determines if one of the display problems 104 has been selected. If the inquiry to decision step 326 is negative, then the "no" branch is followed to the page connector A which takes the process to step 341 of FIG. 3(B).

If the inquiry to decision step 326 is positive, then the "yes" branch is followed to step 329, in which options 110 are displayed for a selected problem 104(A). Next, in decision step 332, the user interface 100 determines if one of the options 110(A) for the problem 104(A) has been selected. If the inquiry to decision step 332 is negative, then the "no" branch is followed to decision step 338. If the inquiry to decision step 332 is positive, then the "yes" branch is followed to step 335, in which the option that was selected is performed. For example, if the command, "Go to this item," is selected, then page containing the selected problem 104(A) will be displayed adjacent to the list 102 of problems 104. At this point, the process proceeds to step 341 in FIG. 3(B).

Referring now to FIG. 3(B), this figure illustrates another part of a process 300 for correcting publishing problems within an electronic document 112. It is noted that steps 326 through 338 may be running in parallel with respect to steps 341 through 380 of FIG. 3(B). That is, when a user selects the user interface 100, the process returns to step 326 so that the user can correct any identified publication problems.

In step 341, when the user has selected to work within the electronic publication 112, user action within the electronic document 112 is monitored by the event manager 202. In step 344, the event manager identifies components of user action and stores the components as separate events in a list of events in the event queue 206.

In decision step 347, event manager 202 determines if an end of a comprehensive user action has occurred. If the inquiry to decision step 347 is negative, then the "no" is branch is followed back to step 341. If the inquiry to decision step 347 is positive, then the "yes" branch is followed to step 350.

In step 350, the event manager 202 can filter out duplicate events in the event list of the event queue 206. In decision step 353, the design checker 210 can determine if the system is at idle. If the inquiry to decision step 353 is negative, then the "no" branch is followed back to step 341. If the inquiry to decision step 353 is positive, then the "yes" is followed to step 356, in which the design checker 210 can filter out events unrelated to publishing from the event list in the event queue 206 received from the event manager 202.

In step 359, the design checker 210 can filter out checks that may involve an object that has been deleted. In routine 362, the design checker 210 can map events with associated potential publishing problems by using an event-to-check-lookup table 500 (illustrated in FIG. 5). Further details of routine 362 will be discussed below with respect to FIG. 5. After mapping events with associated potential publishing problems, the design checker 210 can build or add to the list 216 of checks to run on a document.

In step 368, the design checker 210 can further filter out duplicate checks from the list 216 of checks to run. In decision step 374, the design checker 210 can determine whether the system is still at idle. It is noted that decision step 374 may be run in parallel with all the steps that are executed by the design checker 210. In other word, any step after step 341 can be stopped or put on hold when a user interacts with the electronic document. If the inquiry to decision step 374 is negative, then the "no" branch is followed where the process returns back to step 341. If the inquiry to decision step 374 is positive, then the "yes" branch is followed to routine 377.

In routine 377, each check in the list 216 of checks to run on a document are executed by the respective problem checkers 212. Further details of routine 377 will be discussed below with respect to FIG. 6.

In step 380, the design checker 210 can build or add problems to the list 102 of publishing problems in response to the performance of the checks by the problem checkers 212. The process then returns back to step 323.

Figure 4:
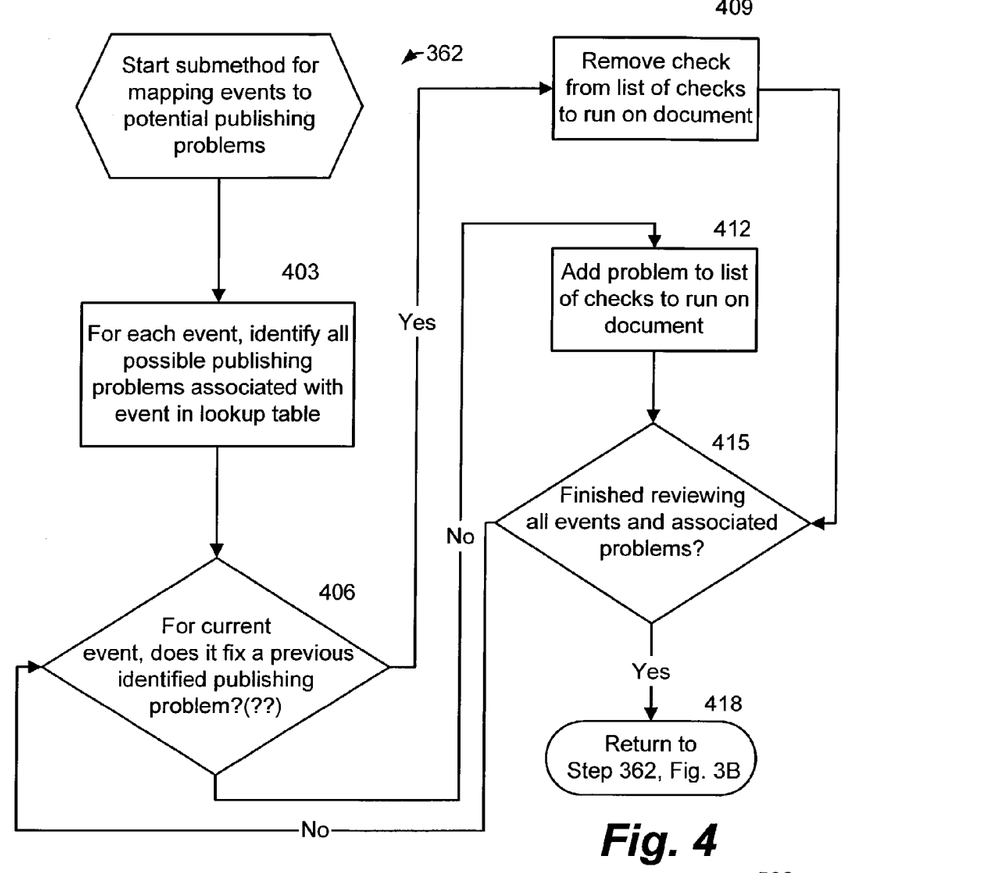
FIG. 4 illustrates a sub-method for mapping events to potential design publishing problems according to one exemplary embodiment of the present invention.

Referring now to FIG. 4, this figure illustrates an exemplary submethod or routine 362 for mapping events to potential publishing problems in an electronic document 112. Step 403 is the first step in the submethod and comprises identifying all possible publishing problems associated with an event in the lookup table 500 for each event.

Next, in decision step 406, it is determined, for a current event being evaluated, whether a current event being evaluated fixes a previously-identified publishing problem. If the inquiry to decision step 406 is positive, then the "yes" branch is followed to step 409, in which the design checker 210 removes the check 218 from the list 216 of checks to run on the electronic document. If the inquiry to decision step 406 is negative, then the "no" branch is followed to step 412, in which the problem is added to the list 216 of checks 218 to run for the current electronic document 112.

Next, in decision step 415, the design checker 210 determines if all events and associated problems have been reviewed. If the inquiry to decision step 415 is negative, then the "no" branch is followed back to decision step 406. If the inquiry to decision step 415 is positive, then the "yes" branch is followed to step 418, in which the process returns back to FIG. 3(B) in step 362.

Referring now to FIG. 5, this figure illustrates an exemplary event-to-check lookup table 500 that is used by the design checker 210. One axis of the table comprises a list of event types, while on another axis comprises a list of potential publication problems. While the design checker 210 goes through the mapping table 500, it creates a list of checks where individual checks are sent to respective problem checkers 212. As table 500 illustrates, an event type, such as event type number 1, may have multiple problems associated with the event.

For example, if the event type is movement of an object on a page in the electronic document 112, possible publication problems can include the following: the object may have been moved off the page, the object may have been moved such that more blank space exists at the top of the page, the moved object may be hiding or covering another object on the page, and other similar problems that can be associated with the movement of objects on a page. The present invention is not limited to the aforementioned event type example. Other event types involving the editing or creating of information in an electronic document are not beyond the scope and spirit of the present invention.

Figure 6:
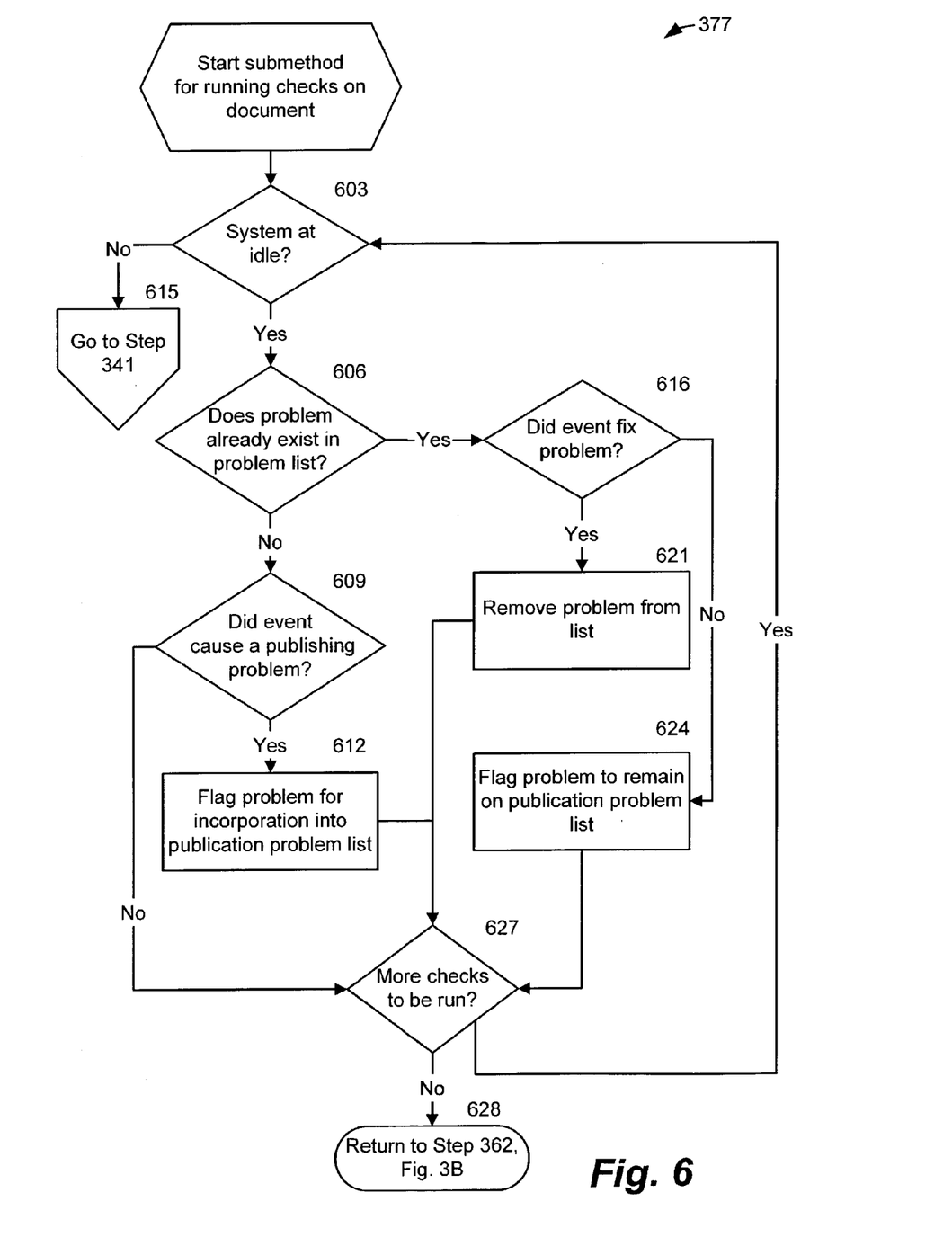
FIG. 6 illustrates a sub-method for running checks on a document for possible design publication problems according to one exemplary embodiment of the present invention.

Referring now to FIG. 6, this figure illustrates an exemplary submethod 377 for running checks on an electronic document. Decision step 603 is the first step of submethod 377, in which it is determined whether the system is at idle. Similar to step 374, it is noted that decision step 603 may run in parallel with all the steps that are executed by the design checker 210. In other words, any step after step 603 in the submethod 377 can be stopped or put on hold when a user interacts with the electronic document. If the inquiry to decision step 603 is negative, then the "no" branch is followed to step 615, in which the process returns to step 341 of FIG. 3B. If the inquiry to decision step 603 is positive, then the "yes" branch is followed to decision step 606.

In decision step 606, the problem checker 212 determines whether the current problem exists in the problem list 102. If the inquiry to decision step 606 is positive, then the "yes" branch is followed to decision step 616. If the inquiry to decision step 606 is negative, then the "no" branch is followed to decision step 609.

In decision step 609, the volume checker 212 determines if the events caused the publishing problem being evaluated. If the inquiry to decision step 609 is positive, then the "yes" branch is followed to 612, in which the problem is flagged by the problem checker 212 for incorporation into the publication problem list 102. If the inquiry to decision step 609 is negative, then the "no" branch is followed to decision step 627.

In decision step 616, the problem checker 212 determines if the event associated with the current problem fixed the problem. If the inquiry to decision step 616 is positive, then the "yes" branch is followed to step 621, in which the problem checker 212 informs the design checker 310 to remove the problem from the list 102. If the inquiry to decision step 616 is negative, then the "no" branch is followed to step 624, in which the problem checker 212 flags the problem to remain on the publication problem list 102.

In decision step 627, the design checker 210 determines if more checks need to be run on the current electronic document. If the inquiry to decision step 627 is positive, then the "yes" branch is followed back to decision step 603. If the inquiry to decision step 627 is negative, then the "no" branch is followed to step 628, in which the process returns to step 362 of FIG. 3(B).

Alternative Embodiments

As noted above, while the invention as illustrated in the figures depicts only visual displays, those skilled in the art will recognize that other forms of communication with the user are not beyond the scope and spirit of the present invention. For example, the present invention can alert a user of potential design publishing problems by producing sounds, voice synthesis, tactile displays, and even smell or taste. Similarly, user action relative to an electronic document can include more than mouse or keyboard entry. User action can further comprise voice commands, pen and screen activity, touch screen activity, and other like user action.

The present invention provides a system and method for checking and resolving publication design problems that is interactive and permits a user to have some control during a document inspection process. The present invention also provides a document inspection process that can provide continuous and real/time feedback on possible design problems while a document is being edited or created.

Further, the invention also provides a document inspection process that identifies all problems of an electronic document and that identifies the types of problems that may be present in an electronic document. This document inspection process of the present invention is integral with a publishing program such that options may be available to the user for automatic correction of certain reoccurring problems. The document inspection process of the present invention is simple to use and easy to manage while an electronic document is being created or edited.

It should be understood that the foregoing relates only to illustrative embodiments of the present invention, and that numerous changes may be made therein without departing from the spirit and scope of the invention as defined by the following claims.

What is claimed is:

1. A computer-implemented method for monitoring and correcting design publication problems of a document comprising:
   receiving input for one of creating, editing, or deleting objects within a document;
   while receiving the input, determining if the created, edited, or deleted objects create possible publication design problems;
   automatically detecting a document output type for publishing the document;
   accessing a list of checks to apply to the document, wherein the list of checks are dependent on the document output type;
   determining if a user has flagged certain checks in the list of checks to skip based upon previously selected user options, the previously selected user options comprising determining whether too much blank space exists on top of a document page, determining whether an object is off the document page, determining whether an object is disproportional on the document page, and determining whether one object covers another object on the document page;
   identifying components of the input;
   storing the components in a list of events in an event queue;
   determining how each event affects publication of the document, wherein each event in the list of events comprises event data, wherein the event data comprises event specific information which comprises the location of change on a document page where a user event has occurred;
   in response to determining possible publication design problems, displaying a user interface addressing a status of the possible publication design problems for the document, wherein the user interface lists at least two of the design problems and allows a user to select an order in which the design problems will be addressed; and
   in response to receiving a selection of a problem from the list, highlighting within the document the problem wherein the problem is highlighted within the document using a screen mechanism.

2. The method of claim 1, further comprising receiving input in the user interface addressing a status of a possible publication design problem.

3. The method of claim 1, further comprising displaying options relating to the status of the possible publication problems.

4. The method of claim 1 further comprising filtering out duplicate events in the list of events.

5. The method of claim 1, further comprising filtering out events unrelated to publishing from the list of events based on determining how each event affects publication of the document.

6. The method of claim 1 further comprising filtering duplicate checks from the list of checks.

7. The method of claim 6, wherein the filtering occurs when a system is idle.

8. A computer-implemented interactive method for monitoring and resolving possible publication problems of a document comprising:
   monitoring action within a document;
   in response to the action, providing feedback in the document relating to status of possible publication problems wherein providing feedback includes displaying a user interface addressing a status of possible publication design problems for the document, wherein the user interface lists design problems and allows a user to select an order in which design problems will be addressed;

automatically determining a type of output for publishing the document;

accessing a list of checks to apply to the document, wherein the list of checks are dependent on the type of output;

determining if the user has flagged certain checks in the list of checks to skip based upon previously selected user options, the previously selected user options comprising determining whether too much blank space exists on top of a document page, determining whether an object is off the document page, determining whether an object is disproportional on the document page, and determining whether one object covers another object on the document page;

searching for possible publication problems specific to the type of output while avoiding a search for problems that could exist for a different type of output; and providing feedback that relates to the type of output;

wherein the type of output comprises one of the following: desktop publishing through a printer; and web site design.

9. The method of claim 8, wherein providing feedback in the document further comprises displaying a user interface in a viewing area separate from the document.

10. The method of claim 8, further comprising:
displaying a list of possible publication problems for the document; and
identifying a problem in the document in response to selection of a problem from the list.

11. The method of claim 8, further comprising:
displaying a list of possible publication problems for the document; and
displaying a page in the document comprising one of the problems in response to selection of the problem from the list.

12. The method of claim 8, further comprising:
displaying a list of possible publication problems for the document; and
highlighting a problem within the document with a screen mechanism in response to selection of the problem from the list.

13. The method of claim 8, further comprising:
displaying a list of possible publication problems for the document;
returning to the document for editing in response to selection of the problem from the list.

14. The method of claim 8, further comprising automatically editing the document to resolve a publication problem.

15. A computer system for creating a work management file, comprising:
a processing unit;
a memory storage device;
a display device coupled to the processing unit for displaying data; and
a program stored in the memory storage device for providing instructions to the processing unit,
the processing unit responsive to the instructions of the program, operable for:
automatically detecting a document output type for publishing the document;
accessing a list of checks to apply to the document, wherein the list of checks are dependent on the document output type;
determining if a user has flagged certain checks in the list of checks to skip based upon previously selected user options, the previously selected user options comprising determining whether too much blank space exists on top of a document page, determining whether an object is off the document page, determining whether an object is disproportional on the document page, and determining whether one object covers another object on the document page;
displaying a list of possible design publication problems associated with the document output type while displaying a document, wherein the list of possible design publication problems allows a user to select an order in which the possible design publication problems will be addressed;
receiving input for one of editing the document or requesting further information on a problem in the list of problems; and
displaying a page in the document comprising the problem in response to the problem being selected from the list wherein the problem is highlighted on the page.

16. The system of claim 15, wherein the processor is further operable for:
monitoring action within the document; and
identifying problems associated with the action.

17. The system of claim 15, wherein the processor is further operable for:
monitoring action within the document; and
updating the list of problems in response to the action.

18. The system of claim 15, wherein the processor is further operable for:
storing user action in a list of events;
determining how the user action affects publication of the document; and
filtering out the user action from the list of events when the user action is determined to be unrelated to publishing.

19. The system of claim 15, wherein the processor is further operable for:
mapping user action with potential design publication problems;
generating a list of checks to run on the document;
executing the list of checks.

* * * * *